(12) United States Patent
Tiihonen et al.

(10) Patent No.: US 6,370,243 B2
(45) Date of Patent: Apr. 9, 2002

(54) METHOD FOR TRANSMITTING DATA TRAFFIC IN A TELECOMMUNICATIONS SYSTEM

(75) Inventors: Arto Tiihonen; Vesa Heikkilä; Olli Liinamaa; Hannu Asujamaa, all of Oulu; Seppo Kuorelahti, Helsinki, all of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/468,049

(22) Filed: Dec. 20, 1999

Related U.S. Application Data

(63) Continuation of application No. PCT/FI98/00570, filed on Jul. 3, 1998.

(30) Foreign Application Priority Data

Jul. 3, 1997 (FI) ................................................. 972851

(51) Int. Cl.[7] ................................................. H04M 7/00
(52) U.S. Cl. ................... 379/219; 379/221.01; 379/229
(58) Field of Search ........................... 379/219, 220.01, 379/221.01–221.15, 222, 229, 230, 201.01–201.12, 207.01–207.16, 93.09; 370/251, 352

(56) References Cited

U.S. PATENT DOCUMENTS

| 5,467,390 A | * | 11/1995 | Brankley et al. | ............ 379/229 |
| 5,610,910 A | * | 3/1997 | Focsaneanu et al. | ........ 370/351 |
| 5,668,857 A | | 9/1997 | McHale | .................... 379/93.07 |
| 5,781,623 A | * | 7/1998 | Khakzar | ........................ 379/230 |
| 5,910,980 A | * | 6/1999 | Ogasawara et al. | .......... 379/142 |
| 5,920,569 A | * | 7/1999 | Loebig | ........................ 370/424 |
| 5,954,799 A | * | 9/1999 | Goheen et al. | .............. 709/250 |
| 6,069,948 A | * | 5/2000 | Yrjana | ........................ 379/230 |
| 6,115,460 A | * | 9/2000 | Crowe et al. | ................ 379/211 |

FOREIGN PATENT DOCUMENTS

| EP | 0 690 635 | 1/1996 |
| GB | 2 294 179 | 4/1996 |
| JP | 09168174 | 6/1997 |
| WO | 96/38018 | 11/1996 |
| WO | 97/40614 | 11/1996 |
| WO | 97/50230 | 12/1997 |

OTHER PUBLICATIONS

Newton's Telecom Dictionary, Version 14, p. 769, Mar. 1998.*
International Search Report for PCT/FI98/00570, Jan. 1999.

* cited by examiner

Primary Examiner—Harry S. Hong
Assistant Examiner—Benny Q. Tieu
(74) Attorney, Agent, or Firm—Altera Law Group, LLC

(57) ABSTRACT

In a telecommunication system comprising a telephone exchange (LE), an access node (AN) connected to the telephone exchange via a standard V5 interface and a data network (DN), a procedure for setting up a direct data connection between the access node and the data network from a terminal device. According to the invention, a data network subscriber is created in the access node (AN), and when the data network subscriber starts call setup, this is not signalled to the local exchange (LE) according to the normal V5 practice. The data network subscriber's call setup request is handled locally in the access node, where also a dial tone is generated for the data network subscriber. A data connection between the data network subscriber and the data network is set up directly from the access node on the basis of the dialing given by the data network subscriber.

9 Claims, 2 Drawing Sheets

METHOD FOR TRANSMITTING DATA TRAFFIC IN A TELECOMMUNICATIONS SYSTEM

Figure 1:
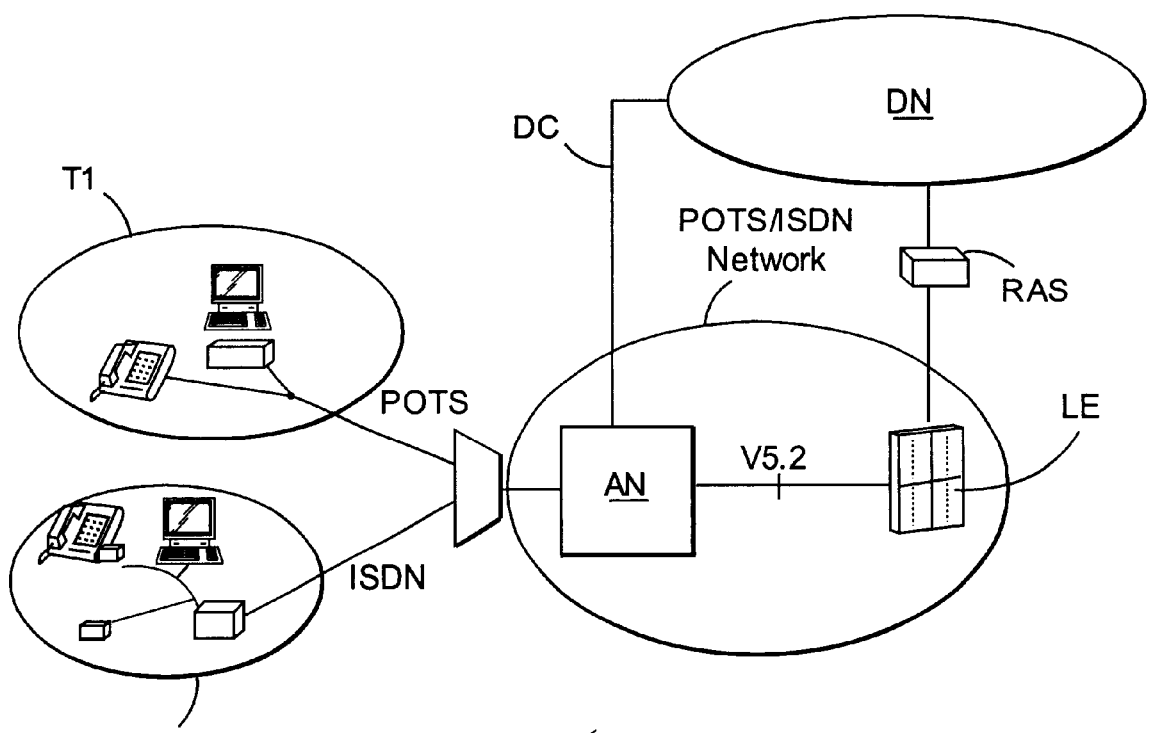

This application is a continuation of PCT/FI98/00570 field Jul. 3, 1998.

The present invention relates to a procedure as defined in the preamble of claim 1 for the switching of data traffic in a telecommunication system.

In prior art, at least two methods are known that can be used to connect a subscriber to a local exchange, by connecting the subscriber via a subscriber line directly to the local exchange or to a subscriber module connected to it, or by connecting the subscriber to the local exchange via a separate access network.

Open interfaces V5.1 and V5.2 between an access network, preferably an access node, and a local exchange are defined in the ETSI (European Telecommunications and Standards Institute) standards of the ETS 300 324 and ETS 300 347 series. A V5 interface enables subscribers belonging to a physically separate access network to be connected to a telephone exchange using a standard interface. The V5.2 interface between an access node and a telephone exchange is a concentrator interface. The reservation and/or connection of the transmission path is performed in accordance with the standard by using the BCC protocol. To do this in practice, the BCC protocol component in the local exchange scans and specifies a free time slot in the V5 interface and then transmits a reservation message to the protocol component in the access node. The protocol component in the access node acknowledges receipt of the message.

Connections to narrow-band data networks, especially the Internet, are mainly effected via a telephone network using switched ISDN or PSTN connections (Integrated Services Digital Network; Public Switched Telephone Network). The structure of access networks has been developed by teleoperators on the basis of the so-called zigzag topology. The capacity of access networks is designed on the basis of an estimated average telephone usage (average call duration, allowed congestion).

The switching of data traffic via the telephone network presents new challenges regarding the use of capacity. When an Internet connection is set up via the telephone network using a switched ISDN connection, the duration of the connection and the amount of data transmitted via the connection differ significantly from a normal voice connection. For this reason, collisions may occur and bottlenecks may be formed in remote concentrator units and local exchanges, hampering the switching of telephone and data traffic. A component particularly susceptible to become a bottleneck is the concentrated V5.2 interface between the access node and the local exchange, because its capacity has been defined on the basis of normal telephone traffic.

Based on the V5 standard, a connection to the Internet set up via a switched ISDN or PSTN link is, like a normal call, first connected to the telephone exchange and further from the telephone exchange to the Internet or other data network or to a remote access unit (RAS, Remote Access Server) connected to it, which may be located in a service provider's station. The remote access unit terminates the ISDN/POTS call setup, takes care of checking the rights relating to call setup and carrying out other corresponding measures before the call is connected to the Internet.

If many subscribers connected to the access node set up a connection to the remote access unit, a situation likely to result is an overload on the V5.2 interface. When this is the case, calls from other subscribers connected to the access node may be congested and fail to be set up. An expedient proposed as a solution to this problem is to set up a direct connection from the access node to the remote access unit. However, the problem is that such a connection is not supported by the V5 standard, which means that several independent and mutually incompatible methods are used to set up the connection. Moreover, the operator encounters problems in trying to adapt different manufacturers' implementations to each other. In normal telephonic calls, when the subscriber starts a call, the access node sends a call start signal via the V5 interface to the local exchange, and the local exchange controls the call process, connects the dial tone, receives the dialing, takes care of the metering, etc. In the case of Internet calls, the access node must handle the routing of the call to the data network independently without the local exchange participating in it.

The object of the present invention is to eliminate the drawbacks described above A specific object of the present invention is to produce a new type of procedure and system in which data connections from subscribers connected to an access node can be set up without congesting the normal telephone network and telephone service.

Another object of the present invention is to produce a simple arrangement for improving the capacity of a telephone network especially to meet the needs of data communication over the telephone network, an arrangement that can be easily implemented using existing standardised technology.

A further object of the present invention is to disclose an arrangement for establishing a data connection that is applicable for all subscriber types, such as those using ISDN and POTS technology. It is also an object of the invention to enable an existing telephone network, especially an access network, to be updated so as to improve its support for data connections using normal telephone network operation control commands without any complex changes in systems or software.

As for the features characteristic of the invention, reference is made to the claims.

A telecommunication system preferable in respect of the invention comprises a telephone exchange, an access node connected to the telephone exchange via a standard V5 interface, and a data network, such as the Internet network or equivalent. Moreover, an embodiment of the system may comprise a remote access unit (RAS, Remote Access Unit), disposed e.g. between the access node and the Internet. In this case, the procedure of the invention allows a direct data connection to be set up between the access node and the data network from a terminal device connected to the access node. There may be a number of direct connections from the access node to the data network and/or remote access unit.

According to the invention, a data network subscriber is analyzed in the access node, and when the data network subscriber starts call setup, this is not signalled to the local exchange according to the normal V5 practice. Further, the signaling of the data network subscriber, of which there may be more than one, is primarily handled in the access node. This means that the call setup request is handled locally in the access node, where also a dial tone is generated for the data network subscriber. Based on the dialing given by the data network subscriber, a data connection between the data network subscriber and the data network is set up directly from the access node. However, if the subscriber dials an external line code or equivalent, then the call setup request will be transmitted to the local exchange in the normal manner.

As compared with prior art, the invention has the advantage that the procedure of the invention is applicable to all subscriber lines (POTS, ISDN) that use a circuit-switched service. As the subscriber signaling of data network or Internet subscribers is always primarily handled by the access node and subscriber signaling is only transmitted to the local exchange after the analysis of a normal call code or prefix or an external line code, ordinary subscribers analyzed in the access node can act just as before, in other words, they need not use an 'external line' code when making a call. The signaling of ordinary subscribers is not handled in the access node, but it is passed transparently and directly to the local exchange in accordance with the V5 specifications.

Subscribers can easily be converted into Internet subscribers because only operation control commands are needed, provided that a link from the access node to the Internet network has been built. In addition, no new cables need to be installed for the data network subscriber.

The solution of the invention reduces the load on the local exchange and transmission links. Moreover, the V5 interface is a standard interface and this solution does not require the local exchange to have any special functions because the local exchange takes no part in data calls beyond receiving a signal indicating that the subscriber is busy. The local exchange is notified of the non-availability of the subscriber by existing methods, such as the Control protocol of the V5 interface. However, the V5 standard does not in itself cover or support a switched data call from the access node. The subscriber can go on using all the existing functions and he/she need not get a second telephone line for the Internet. In addition, the subscriber may still set up e.g. a modem connection via the normal telephone network.

A further advantage provided by the invention is that, for an Internet subscriber, the only difference to the old line is that, when making a telephone call to the ordinary telephone network, he/she must dial a normal-call code or an external-line code before the telephone number to get the dial tone generated by the local exchange and to have the call set up normally via the V5 interface.

From the operator's point of view, the invention provides the advantage that savings are made as resources are not reserved because of Internet traffic. In addition, the same access node may contain subscriber lines of more than one Internet operator.

In an embodiment of the present invention, a request from a data network subscriber for the setup of a voice call and/or data connection is analysed and, if it is discovered that the data network subscriber is setting up a data connection to a data network, then the group switch of the access node is instructed to set up a data connection using a link between the access node and the data network.

In a preferred case, after the data network subscriber has been connected to the data network, the local exchange is sent a signal indicating that the data network subscriber is busy. Thus, the local exchange is able to keep a record of the status of the data network subscribers connected to the access node and is therefore able to act in an appropriate manner in any given situation. Further, after the data network subscriber has disconnected a data connection to a data network, the local exchange is sent a signal indicating that the data network subscriber is available. These signals can be given e.g. using the normal V5 interface signaling protocol, such as the Control protocol.

If a data network subscriber is setting up a normal voice call, then the data network subscriber's call setup request is provided with a prefix, generally a selection entered via the terminal device, by which the access node identifies the call as a normal call. Based on the prefix, a notice about the data network subscriber's call setup request is sent to the local exchange, which starts call control in a manner consistent with the V5 specifications.

Figure 2:
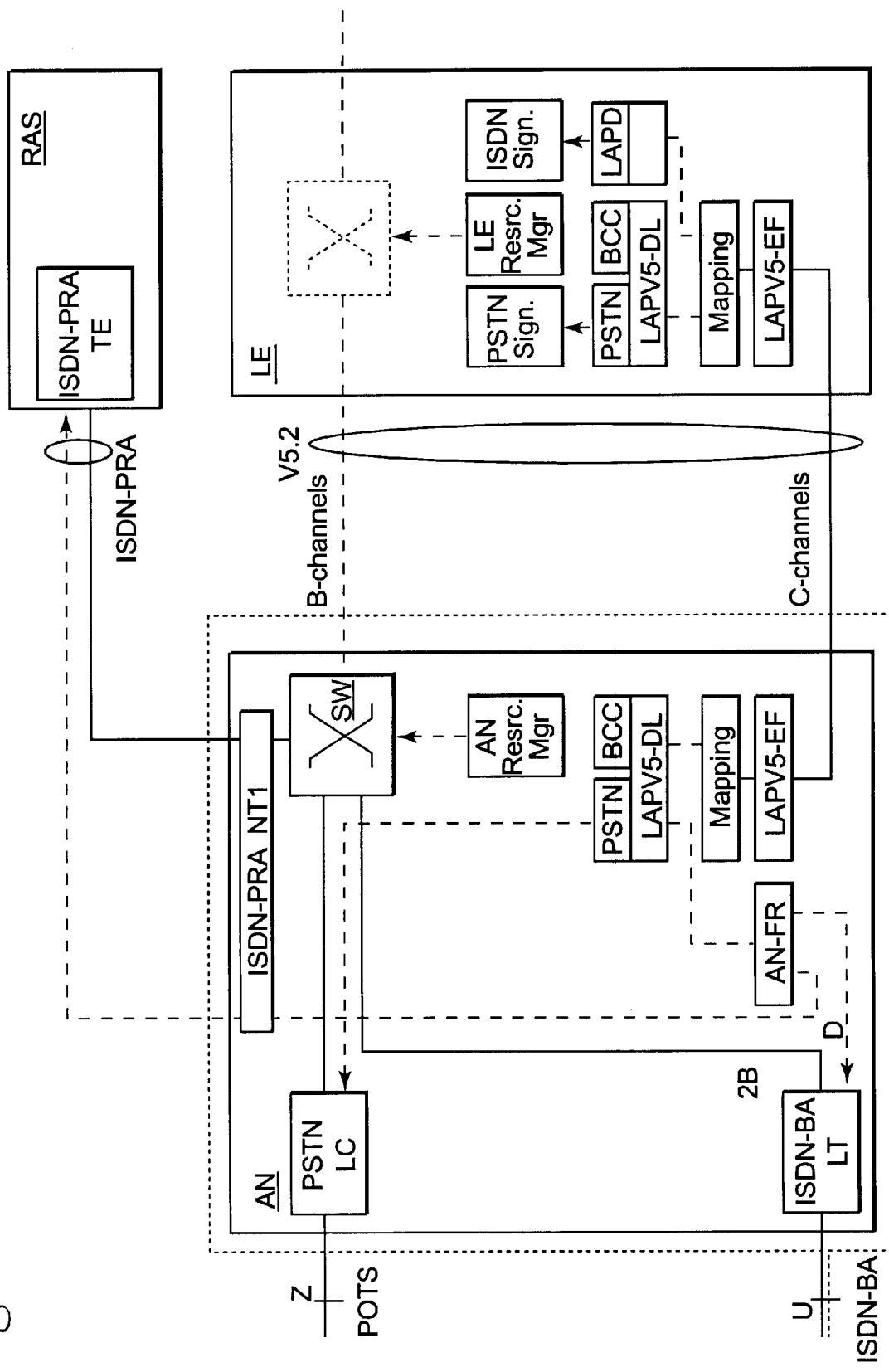

In the following, the invention is described by the aid of preferred embodiments by referring to the attached drawing, in which FIG. 1 is a diagram representing a telephone network in which the procedure of the invention can be applied; and FIG. 2 is a diagram representing the connections in an access node and a local exchange that are essential in the procedure of the invention.

The telephone network presented in FIG. 1 comprises a local exchange LE and an access node AN connected to it via a V5.2 interface. Connected to the access node AN are two terminal devices T1 and T2. The first terminal device T1 is connected to a subscriber line (POTS; Plain Old Telephone System) supporting conventional telephony and it may consist of a computer and an ordinary modem connected to it. The second terminal device T2 is connected to a subscriber line supporting ISDN technology and it may also consist of a computer and an ISDN-TA adapter connected to it. Also, an ISDN router may be connected to the ISDN line to connect a local network or equivalent via the telephone network to another data network. A data connection DC is provided directly from the access node AN to the remote access unit RAS, which is disposed between the telephone exchange LE and the data network DN.

In prior art, calls to be connected from the first and second terminal devices to a data network, such as the Internet IP, have been set up via the access node AN and the local exchange LE. The connection between the telephone exchange ISDN, POTS and the data network IP has been matched by means of a remote access unit RAS. In addition, the remote access unit may have contained functions relating to billing and the identification of the subscriber requesting call setup. Data traffic, being considerably heavier than telephone traffic, has caused congestion of the V5.2 interface between the access node AN and the local exchange LE.

Referring to FIG. 2, a more detailed description will now be given of the components in the access node AN and local exchange LE that are essential to the invention and are shown in the figure. The access node comprises a group switch SW and subscriber lines PSTN LC and ISDN-BA LT connected to it. There may be more subscriber lines connected to the access node than those presented in the figure. The group switch SW is controlled by a Resource Manager comprised in the access node AN. Associated with the Resource Manager are the protocol objects PSTN, BCC controlling the V5.2 interface.

The ISDN signaling to be transmitted over the V5.2 interface is only packed in "envelopes" (envelope function) and sent in envelopes over the interface, to be unpacked in the local exchange; thus, the actual call control in ISDN connections is effected in accordance with the ISDN protocol, controlled by the local exchange. The V5.2 interface signaling is adapted by a matching function, Mapping, to make it correspond to the other types of signaling (PSTN) used in the telephone network. Correspondingly, the local exchange contains the same functions and protocol objects as the access node.

It is further pointed out that structural blocks presented in FIG. 2 that are not mentioned here are consistent with the normal V5 standard; as for these blocks, reference is made to said standard.

The basic idea of the invention will now be described. In the access node, Internet customers who mainly use their subscriber line for Internet connections are defined as data network subscribers. In this example, the subscriber lines associated with the two terminal devices T1 and T2 have been defined as data network subscribers in the access node AN, so when they start a call, the access node will not send a start signal to the local exchange LE according to the normal V5 standard, but instead it will switch on a data call dial tone itself and start receiving the dialing given by the subscriber.

The access node AN directs the call to the Internet, i.e. to a certain data port provided in the access node, on the basis of information obtained from the subscriber line (signaling). This information may be obtained e.g. from push-button dialing transmitted by the terminal device, from ISDN signaling or from a teleservice request (hot line or the like). A data connection to the data port can be established via a separate link between the access node and the remote access unit. This link may be e.g. an ISDN system line ISDN-PRA.

When the data network subscriber is busy with a data call, the access node AN, using V5 signaling, informs the local exchange that the subscriber is temporarily unable to receive normal telephone calls. Upon termination of the data call, the AN releases the subscriber in the LE, whereupon the subscriber can again receive incoming calls as normal.

On the other hand, if an Internet customer wishes to make a telephone call to the normal telephone network, the customer will first dial an 'external line' code (e.g. '0'), whereupon the access node AN will set up a connection to the local exchange LE as in the case of a normal outgoing call. In this case, the customer will receive from the local exchange LE another dial tone, one associated with telephone calls, whereupon the customer can make a normal call.

Let it be further noted that, in the solution of the invention, the billing for the connections can be effected using e.g. monthly charges, unless a time charging system is built into the access node AN. Internet operators can use their own systems for billing for services and for authentication and identification of subscribers, e.g. in the remote access unit RAS. However, a subscriber-specific identifier, e.g. the calling subscriber number, must be stored in the access node AN, which will send it to the Internet at the start of a data call. The Internet operator can identify its customers by this identifier.

The invention is not restricted to the examples of its embodiments described above, but many variations are possible within the framework of the inventive idea defined by the claims.

What is claimed is:

1. In a telecommunication system comprising a local telephone exchange, an access node connected to the local telephone exchange via a concentrating interface, a group of subscribers, and a data network, a method for preventing congestion in the concentrating interface by setting up a data connection directly between an access node and a data network based on a predefined status of a subscriber initiating a data connection, said method comprising:

defining a status definition of either a voice subscriber or a data subscriber for each subscriber;

storing said status definitions in the access node;

receiving a call setup request from a calling subscriber in the access node;

determining whether the status of said calling subscriber is voice subscriber or data subscriber by using the stored status definitions;

preventing the received call setup request from being signaled further to a local telephone exchange, if the determined status of said calling subscriber is data subscriber;

generating a dial tone locally in the access node for the calling subscriber, if the determined status of said calling subscriber is data subscriber;

receiving and processing dialing from the calling subscriber locally in the access node, if the determined status of said calling subscriber is data subscriber; and setting up a data connection between the calling subscriber and the data network directly from the access node based on the received dialing, if the determined status of said calling subscriber is data subscriber.

2. The method as defined in claim 1, wherein the method further comprises:

instructing a group switch of the access node to set up the data connection using a link between the access node and the data network, if the determined status of said calling subscriber is data subscriber.

3. The method as defined in claim 1, wherein the method further comprises:

sending a signal indicating that the calling subscriber is busy to the local telephone exchange after connecting said subscriber to the data network, if the determined status of said calling subscriber is data subscriber.

4. The method as defined in claim 1, wherein the method further comprises:

sending a signal indicating that the calling subscriber is available to the local telephone exchange after said subscriber has disconnected the data connection to the data network, if the determined status of said calling subscriber is data subscriber.

5. The method as defined in claim 3, wherein said signal from the access node to the local telephone exchange are given using normal V5 interface signaling protocol.

6. The method as defined in claim 1, wherein, the method further comprises:

providing a call setup request from a calling subscriber with a prefix by which the access node identifies the call as a voice call, if the determined status of said calling subscriber is data subscriber and said calling subscriber wishes to set up a voice call; and sending a notice about said setup request to the local telephone exchange on the basis of said provided prefix.

7. The method as defined in claim 1, wherein the data network comprises a remote access unit used to match data connections between the local telephone exchange and the data network.

8. The method as defined in claim 7, wherein a data connection between the calling subscriber and the data network is set up via the remote access unit, if the determined status of said calling subscriber is data subscriber.

9. The method as defined in claim 1, wherein a number of direct links are provided between the access node and the data network and remote access unit.

* * * * *